(12) United States Patent
Graham et al.

(10) Patent No.: US 9,384,297 B2
(45) Date of Patent: Jul. 5, 2016

(54) SYSTEMS AND METHODS OF ACCELERATING DELIVERY OF REMOTE CONTENT

(75) Inventors: Christoph J Graham, Houston, TX (US); Chi W. So, Spring, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1071 days.

(21) Appl. No.: 13/193,292

(22) Filed: Jul. 28, 2011

(65) Prior Publication Data

US 2013/0031204 A1  Jan. 31, 2013

(51) Int. Cl.
  G06F 15/16 (2006.01)
  G06F 17/30 (2006.01)
  H04L 29/08 (2006.01)
  H04N 21/234 (2011.01)
  H04N 21/25 (2011.01)
  H04N 21/258 (2011.01)

(52) U.S. Cl.
  CPC .......... G06F 17/30899 (2013.01); H04L 67/02 (2013.01); H04L 67/2847 (2013.01); H04N 21/23406 (2013.01); H04N 21/251 (2013.01); H04N 21/25841 (2013.01)

(58) Field of Classification Search
  CPC ................................................... H04L 67/2847
  USPC .................................................... 709/215, 217
  See application file for complete search history.

(56) References Cited

U.S. PATENT DOCUMENTS

| 2009/0112975 | A1* | 4/2009 | Beckman et al. ............. 709/203 |
| 2010/0049678 | A1* | 2/2010 | Huang et al. .................... 706/14 |
| 2013/0097309 | A1* | 4/2013 | Ma .................... H04L 29/08099 709/224 |

OTHER PUBLICATIONS

Elbashir, K., Transparent Caching of Web Services for Mobile Devices, <http://madmuc.usask.ca/Pubs/kamal880.pdf>.
Narra, V.C., Survey on Access Delay Optimization in Content Delivery Networks,<http://medianet.kent.edu/surveys/IAD04f-vamsi/cdn.html>,2001.
Xu et al,Semantics-based Personalized Prefetching to Improve Web Performance, <http://www.ece.eng.wayne.edu/~czxu/paper/Prefetching.pdf> On pp. 636-643, Apr. 2000.

* cited by examiner

*Primary Examiner* — Adnan Mirza
(74) *Attorney, Agent, or Firm* — Trenner Law Firm, LLC

(57) ABSTRACT

Systems and methods of accelerating delivery of remote content are disclosed. An example method includes monitoring usage of a client for content at a remote source over time to predict client access to content. The method also includes prefetching related content from the remote source based on the usage by the client. The method also includes delivering the prefetched related content to the client if the client requests access to corresponding content at the remote source.

20 Claims, 5 Drawing Sheets

SYSTEMS AND METHODS OF ACCELERATING DELIVERY OF REMOTE CONTENT

BACKGROUND

The client/server computing environment continues to expand into web services, often referred to as Web 2.0, with the latest iteration of Internet supported programmatic access to services and data provided by many providers. Traditionally web applications have been fairly static in nature. But as the various web browsers have both grown in capability and functionality and have become increasingly compliant with standards based computing, developers are moving to a viable application development environment that is highly adaptive, readily prototyped, and readily scaled through hosted web services. Much of the recent efforts are focused on optimizing these applications.

Hosting software within the web browser is beneficial for stabilizing cross platform compatibility, but is deficient in the area of performance benefits offered by traditional compiled language runtimes and specialized executable binaries. Efforts to increase responsiveness traditionally associated with rich client-based or so called "boxed" software solutions have focused on optimizing the rendering engine, the data model, or the script engine.

One such solution focuses on offloading security computations to a hardware component on the local device to enable hardware assisted SSL or similar secure protocols. This solution is designed to alleviate the computation burden from the systems processor. Other solutions utilize network topologies that support prioritization of packets for preferred protocols or endpoints. This solution allows some network services or applications to use a larger portion of the available network bandwidth at the expense of other network traffic. Still other solutions utilize network devices that support compression of payload, allowing more data to be transmitted via fewer packet requests.

A stronger solution is still needed as more applications are modeled to rely on services hosted within the internet.

DETAILED DESCRIPTION

As more computer applications are modeled to utilize (and in some cases to rely on) services hosted on large networks such as the Internet, the realized performance of those applications can be limited by the available bandwidth, the number of network round trips, and the latency in network round trips to serve application data and functionality. The systems and methods disclosed herein are directed generally to improving these remote (or web-based) services and classes of applications. In an example, the systems and methods disclosed herein prefetch remote content that is determined to be relevant to the application or the end user based on a description of a web service and access patterns or other usage characteristics by the end user and/or the application.

In an example, an accelerated delivery system for remote content includes an analyzer to identify access patterns or other usage of content at a remote source. In an example, the analyzer monitors call functions by the client.

In another example, the analyzer monitors client requests for content from the remote source at a parameterized data level. The analyzer may also use heuristic approaches or predefined responses from the end user, such as a user profile. The system also includes a cache to store prefetched related content from the remote source based on the identified usage, the prefetched related content available locally if requests are made to access corresponding content at the remote source. In an example, the cache stores prefetched content including subsets of the prefetched content, the subsets based on predictive access to content at the remote source. In another example, the cache stores prefetched content including adjacent content based on predictive access to content at the remote source.

Accordingly, the systems and methods disclosed herein offer networked computing performance improvements based on a semantic understanding of the data and processes used to manipulate the data. Several examples provided herein are based on examination of the HTTP protocol stack and the interaction of various web client applications and their hosting models. Each of these client to server APIs are built on top of the common HTTP semantics. Therefore, it is possible to create a framework for predictive caching that is aware of specific APIs requirements.

Before continuing, it is noted that as used herein, the terms "includes" and "including" mean, but is not limited to, "includes" or "including" and "includes at least" or "including at least." The term "based on" means "based on" and "based at least in part on."

Figure 1:
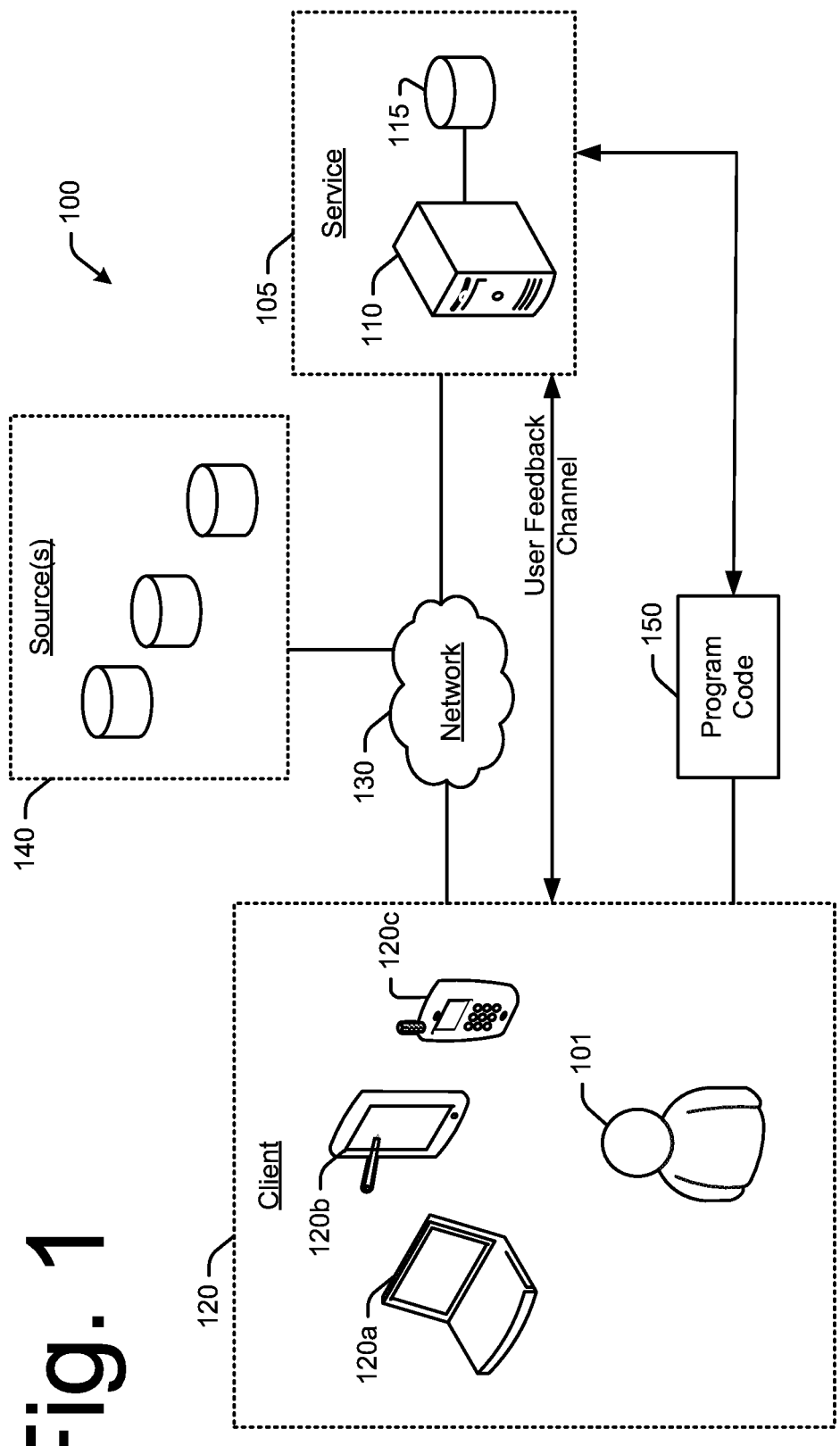
FIG. 1 is a high-level block diagram of an example networked computer system which may be implemented for accelerating delivery of remote content.

FIG. 1 is a high-level block diagram of an example networked computer system which may be implemented for accelerating delivery of remote content. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a host 110 providing a service 105 accessed by a user 101 via a client device 120. For purposes of illustration, the service 105 may be an online data processing service executing on a host 110 configured as a server computer with computer-readable storage 112. Example services may include general purpose computing services (e.g., access to government and other sources of data sets hosted on the Internet or as dynamic data endpoints for any number of client applications). Services also include interfaces to application programming interfaces (APIs) and related support infrastructure which were previously the exclusive domain of desktop and local area network computing systems, such as application engines (e.g., word processing and graphics applications), and hosted business services (e.g., package delivery and tracking, online payment systems, and online retailers).

The client 120 may be any suitable computer or computing device 120*a-c* capable of accessing the host 110. Host 110 and client 120 are not limited to any particular type of devices. Although, it is noted that the operations described herein may be executed by program code 150 residing on the client (e.g., personal computer 120*a*), but in some instances (e.g., where the client is a tablet 120*b* or mobile device 120*c*) may be better performed on a separate computer system having more processing capability, such as a server computer or plurality of server computers on a local area network for the client 120.

The system 100 may also include a communication network 130, such as a local area network (LAN) and/or wide area network (WAN). In one example, the network 130 includes the Internet or other mobile communications network (e.g., a 3G or 4G mobile device network). Network 130 may also provide greater accessibility to the service 105 for use in distributed environments, for example, where more than one user may have input and/or receive output from the service 105.

The host 110 and client 120 may be provided on the network 130 via a communication connection, such as via an Internet service provider (ISP). In this regard, the client 120 is able to access host 110 directly via the network 130, or via an agent, such as another network.

In an example, the program code 150 has access to both the client 120 and the service 105 in the networked computer system 100. For example, the service 105 may be a cloud-based service, wherein the program code is executed on at least one computing device local to the client 120, but having access to the service 105 in the cloud computing system.

Before continuing, it is noted that the computing devices are not limited in function. The computing devices may also provide other services in the system 100. For example, host 110 may also provide transaction processing services and email services for the client 120.

In addition, the service 105 may include at least one remote source 115 of content, and/or the service 105 may be operable to communicate with at least one remote source 140 of content. That is, the source may be part of the service 105, and/or the source may be physically distributed in the network and operatively associated with the service 105. In any implementation, the source may include any content. For example, the source 140 may include databases for providing information, applications for providing application data, storage resources for providing online storage facilities. There is no limit to the type or amount of content that may be provided by the source. In addition, the content may include unprocessed or "raw" data, or the content may undergo at least some level of processing.

As mentioned above, the program code 150 may be executed by any suitable computing device to identify access patterns or other usage by the client 120 for content at a remote source. In addition, the program code may serve one or more than one client 120. During execution, content may be prefetched from the remote source based on the identified usage. For example, if the client 120 is currently accessing a news website on the Internet, all of the top news stories for the current day may be prefetched and stored locally for the client 120. Accordingly, the client 120 is able to have faster access to the day's top news stories from the local cache.

In another example, a number of clients 120 for an organization may access stock quotes during certain hours of the day (e.g., at the opening bell in the morning and again at the closing bell in the afternoon). Based on usage, content including stock quotes may be prefetched in advance of these high access times, and stored on a local cache for the clients 120. This example may be implemented by providing the analyzer function and cache outside any particular client system. As such, when the clients 120 request content that has already been prefetched, the client(s) 120 are provided with the corresponding content which has already been prefetched, making the content available to the clients 120 much faster than if the clients 120 had to request that same content from the remote site.

Figure 2:
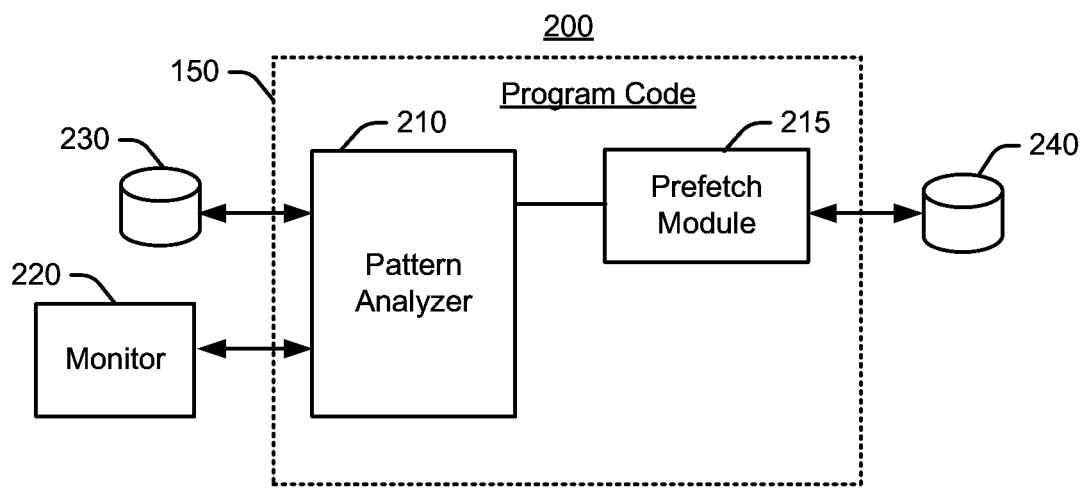
FIG. 2 shows an example architecture of machine readable instructions, which may execute program code for accelerating delivery of remote content.

The program code 150 can be better understood with reference to FIG. 2 and the following discussion of various example functions. However, the operations described herein are not limited to any specific implementation with any particular type of program code.

FIG. 2 shows an example architecture 200 of machine readable instructions, which may be executed for accelerating delivery of remote content. In an example, the program code 150 discussed above with reference to FIG. 1 may be implemented in machine-readable instructions (such as but not limited to, software or firmware). The machine-readable instructions may be stored on a non-transient computer readable medium and are executable by one or more processor to perform the operations described herein. It is noted, however, that the components shown in FIG. 2 are provided only for purposes of illustration of an example operating environment, and are not intended to limit implementation to any particular system.

The program code executes the function of the architecture of machine readable instructions as self-contained modules. These modules can be integrated within a self-standing tool, or may be implemented as agents that run on top of an existing program code. In an example, the architecture of machine readable instructions may include an analyzer 210 and an prefetch module 215.

The analyzer 210 may be associated with one or more monitor 220 and/or one or more database 230. The analyzer 210 analyzes real-time data (e.g., from the monitor 220), historical data (e.g., from the database 230), or a combination of real-time and historical data to identify patterns or trends or other usage parameters for the client accessing at one or more remote source. The analyzer may also analyze the type of content being accessed, the duration of access, the time of access, and other parameters. Analyzer 210 may be operatively associated with the prefetch module 215 to indicate which content should be prefetched and stored locally for the client, e.g., in a cache 190.

Data analyzed by the analyzer 210 may include information related to call functions by the client. For example, call functions may be used to analyze web service protocols being used so that content can be prefetched and cached from the network service in an effort to reduce application latency. Data may also include usage at a parameterized data level. For example, prioritizing schemes for data packets may be inspected at a high level to determine whether the data packets are voice over IP (VoIP) packets and therefore should be assigned a higher priority than general Internet browsing data packets. But the systems and methods disclosed herein may analyze data access at a lower level, known as the parameterized data level, such that trend and analysis algorithms may be implemented to carry out an analysis and the associated caching described herein.

It is noted that any suitable analysis may be applied by the analyzer 210. For example, the analysis may be based on statistical models, predictive models, heuristic techniques, and others, and combinations of these techniques. In addition, the analysis may be implemented using any suitable function (s) f(x) or combination of functions, for linear, non-linear, and/or spatial analysis. Furthermore, the functions may be single variable or multivariate in nature.

There are several predicates in caching and analytical prefetch that may be useful to understand. For example, proxy servers and internet gateways may provide caching services for web-based content. This is usually limited to preserving web page content and associated MIME content for a period of time in case another computer system inside the network controlled by the proxy or gateway server requested the same content.

It is possible to extend such caching to the context of prefetching by analysis of the web page and building inferences to information to be requested based on the statically available content of the page. For example, a method and apparatus for a server that includes a file processor that interprets each requested data file (e.g., a web page) requested by the client may be used in a process analogous to that of a browser application, or other requesting application. The file processor initiates the loading of each referenced data item within the requested document in anticipation that the client will make the same requests upon receiving the requested data file.

Web 2.0, cloud-computing, and web services, which are all forms of client/server computing systems, rely heavily on web protocols such as XML over HTTP or HTTPS. These web services protocols can be inspected by a computing system. It is also possible that such an intermediary computing system may be used to prefetch application data by specifying a range of requests to the web service or services based on either cumulative analysis of parametric data and/or priori knowledge of the parametric data and its relationship within the web services application.

Based on this analysis, a computational apparatus and storage system may be utilized which sits between the network path of the client and the hosted web service. This apparatus may be used to analyze web traffic searching for requests of data from web services by the client. Through analysis, or prebuilt instruction, the apparatus then makes requests to the web service on behalf of the client. These API calls may contain input parameter data provided by the apparatus, which is designed to prefetch web service data under the assumption that the client eventually makes the same request.

Consider the example of a web hosted application to view geographical map data. The API supports viewing map data from a particular location or point (e.g., address, geophysical point, or other geographical tag). The API also supports panning and zooming from that point into a more detailed view of the mapped environment. Because the semantics of the API are known, the system prefetches the panned and zoomed views of data around the starting location by knowing the semantics of the API in use, and the initial user/customer intent to view map data from this API service.

Because the system makes predictions at future user/customer needs by relying on a hosted service, the time between network round trips with the service can be reduced by performing these queries ahead of actual user demand. This occurs all while leveraging the elastic web infrastructure afforded by hosted services models.

It is noted that various implementations are contemplated. In an example, prefetching and caching content may be a desktop implementation, wherein at least the cache is physically at a client computing device. In another example, the cache may be on a local area network for the client (e.g., at a server device, router, or other network device). In other examples, the cache may be anywhere between the source and the client. The specific network distance will depend at least to some extent on design considerations, such as but not limited to, the value added or realized latency reduction, the cache capacity and bandwidth of the client (e.g., a desktop computer system may have higher cache capacity and bandwidth than a mobile device such as a smart phone), desired quality of service or service level, to name only a few examples.

The system and method for accelerating delivery of remote content may be further understood with reference to the following examples.

Figure 3:
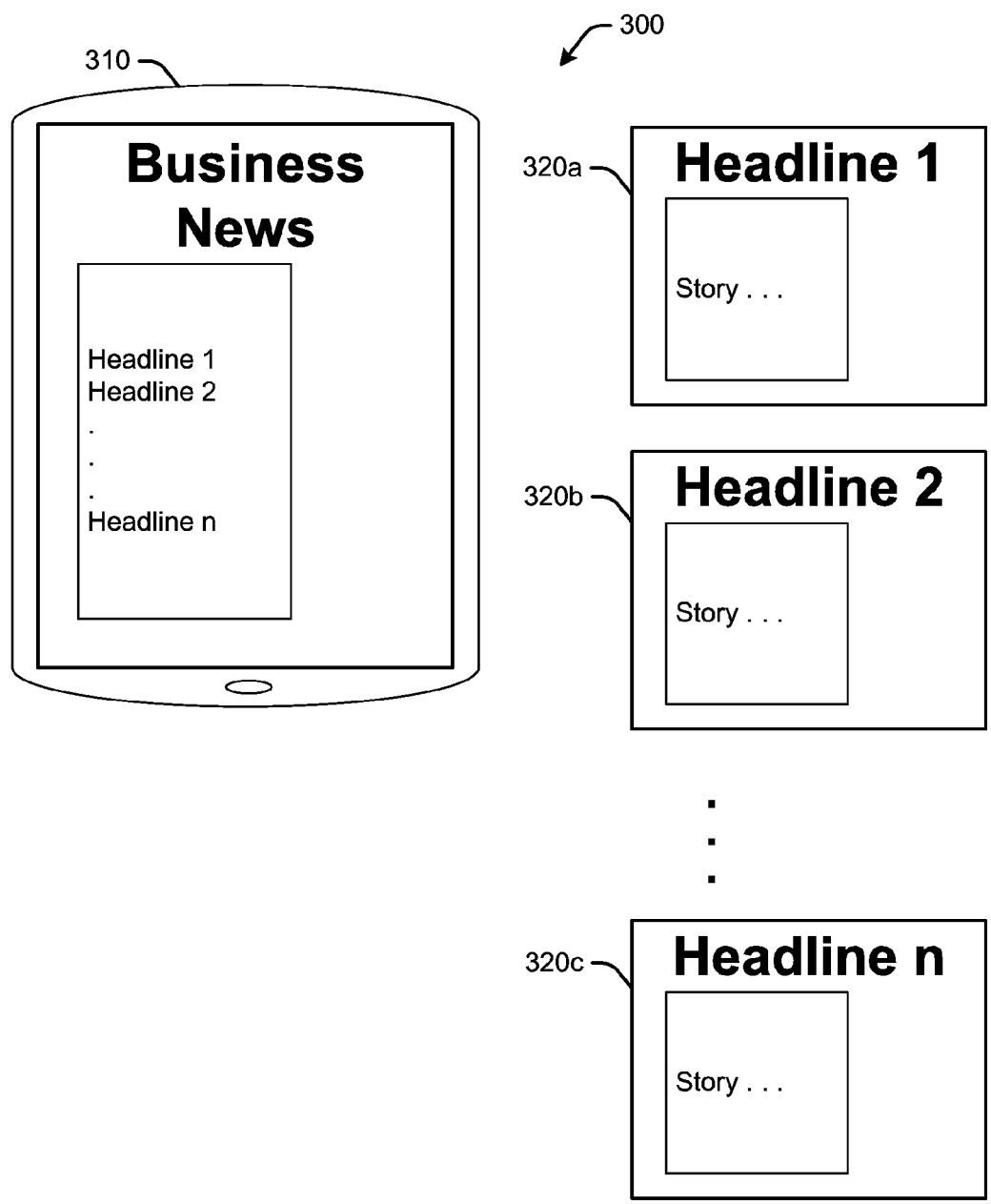
FIG. 3 shows an illustration of example analysis and prefetching for content subsets.

FIG. 3 shows an illustration of example analysis and prefetching for content subsets. The client may be accessing an online news source 300. The transactions between the client and news source may include exchanges and requests for news stories. An analysis of these transactions may indicate that the user is viewing the business news displayed on a tablet device 310.

In this example, the news source may have already provided the client with the business news headlines. Based on the analysis, the system may prefetch subsets of the news articles 320a-c related to the business headlines. The analysis and prefetching may be characterized as Y content (i.e., the business news headlines) including subset $\{Y+1\}$ content and subset $\{Y-1\}$ content. In an example, subset $\{Y+1\}$ content represents the next business news headline, and subset $\{Y-1\}$ content represents the previous business news headline.

Accordingly, the user is able to quickly access business news headlines, which are retrieved from cache instead of the user having to wait for the online news source to send the content to the user. Further efficiencies are realized, for example, by not caching all of the headlines from the news source, but only those relevant to the user (e.g., the business news headlines) based on the analysis.

Still further efficiencies may be realized by recognizing deeper usage characteristics over time. For example, if the user typically only views business stories related to the stock market, then only those headlines may be prefetched for the user. Such analysis may be dynamic and change over time. For example, the user may follow a particular story in the Entertainment section for a short duration, and accordingly headlines related to that particular story can be prefetched until it is determined by the analysis that the user is no longer interested in that storyline.

Of course other examples are also contemplated. For example, the subsets may represent subsets of data for a mapping application (e.g., business locations in the area where the user is currently viewing on the map). In another example, the subsets may represent subsets of results, such as the results of Internet searches, stock indices, calculations, formatting, or other determinations based on user selections.

Still other examples may include the client desiring data in some other format than its hierarchy, such as news from the "most downloaded" content. The user desires may be based on prior usage (e.g., preferred formats), and used to prefetch data in the user's desired format. In another example, the user may have a usage profile that identifies a certain type of content the user prefers, such as "Sports Stories." The usage profile may be generated over time automatically and may also include input by the user. The usage profile may then be used for prefetching content based at least in part on the usage profile. Still other examples are also contemplated.

Figure 4:
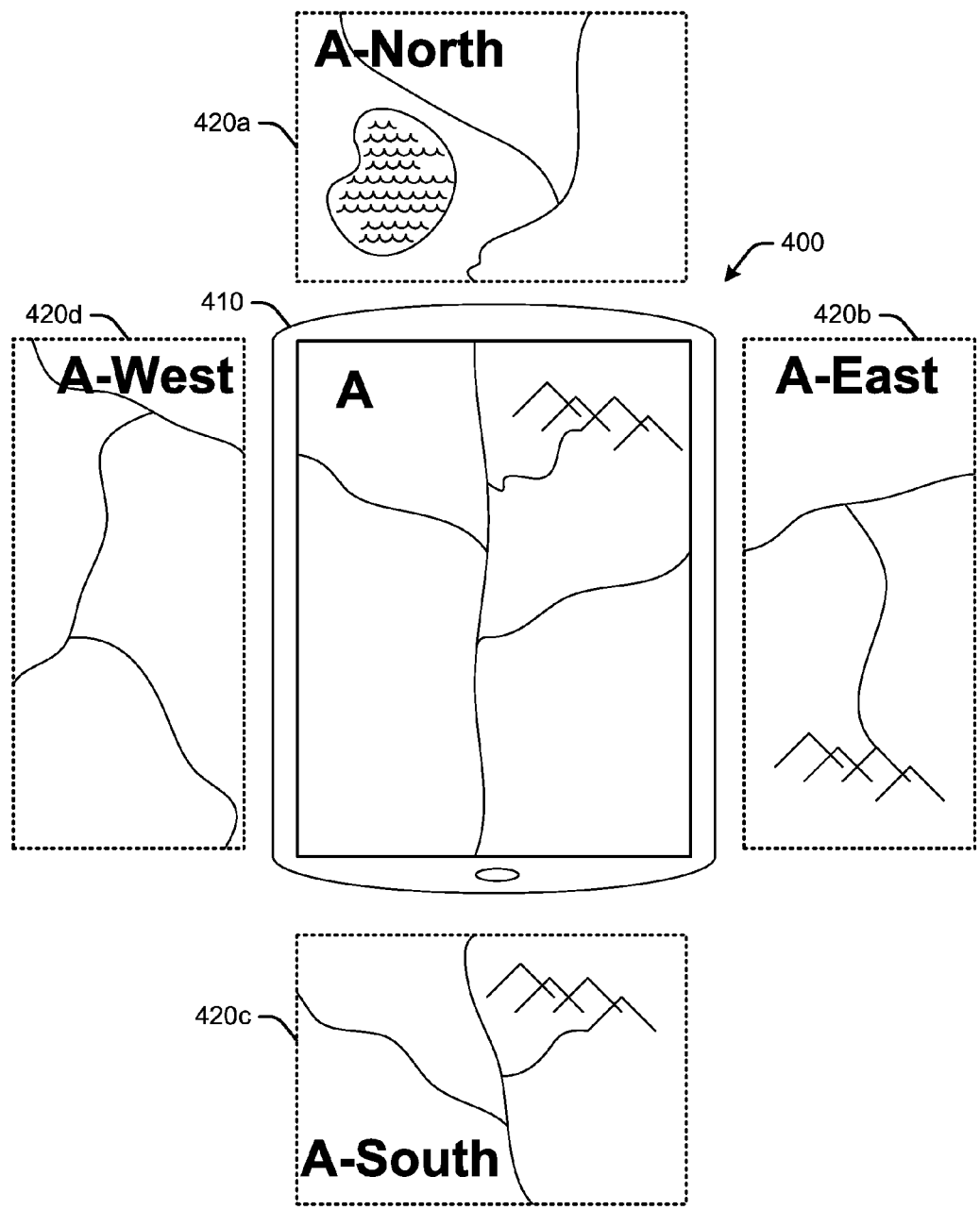
FIG. 4 shows an illustration of example analysis and prefetching for adjacent content.

FIG. 4 shows an illustration of example analysis and prefetching for adjacent content. The client may be accessing a remote map application. The transactions between the client and map application may include exchanges and requests for location data and associated graphics. An analysis of these transactions may indicate that the user is in Area A indicated on map 400 displayed on a tablet device 410, and accordingly it may be inferred that the user may scroll over to surrounding areas 420a-d.

The mapping application may have already provided the client with graphical map data representing Area A on the map 400. Based on the analysis, the system may prefetch adjacent content (either directional in the X, Y coordinate space, in the zoom level in the Z direction, or in another dimension such as content or metadata associated with a position). In this example, adjacent content may include areas that are north and south of area A and/or areas that are east and west of area A. Accordingly, the user is able to quickly scroll through adjacent graphical map data which has already been prefetched and stored in a local cache, thereby reducing latencies from having to request the map data from the remote source when the user scrolls.

In another example, the mapping application may also include directional data indicating the direction of travel of the user. If the user is travelling north, forth example, then the adjacent content 420a may be prefetched and cached, and other adjacent content 420b-d may not be prefetched. Deeper the analysis such as this may result in further efficiencies, e.g., by not prefetching and caching all of the adjacent content, but instead only prefetching and caching adjacent content which is most likely to be utilized by the client.

Of course other examples are also contemplated. For example, the adjacent content may represent prior and subsequent pages for a website (e.g., pages in an article the user is reading at an online news source). In another example, the adjacent data may represent results, such as the results of Internet searches, stock indices, calculations, formatting, or other determinations based on user selections.

It is noted that prefetching content may be when the client has already accessed particular content. Prefetching content may also be predictive, before the client has accessed particular content.

Still other examples are also contemplated. The systems and methods described herein are not limited to content, and can also be implemented with online applications, such as online word processing, graphic design, and other applications.

In addition, the systems and methods may be implemented with multiple clients, and the amount and type of content cached may be based on user demand. For example, the system may prefetch 10% of an online video if 1 or 2 users are viewing the video, but prefetch more video data and/or add more connections to the remote site to pull data faster or enable more sessions if the network quality of service drops when more users are added.

Before continuing, it should be noted that the examples described above are provided for purposes of illustration, and are not intended to be limiting. Other devices and/or device configurations may be utilized to carry out the operations described herein.

Figure 5:
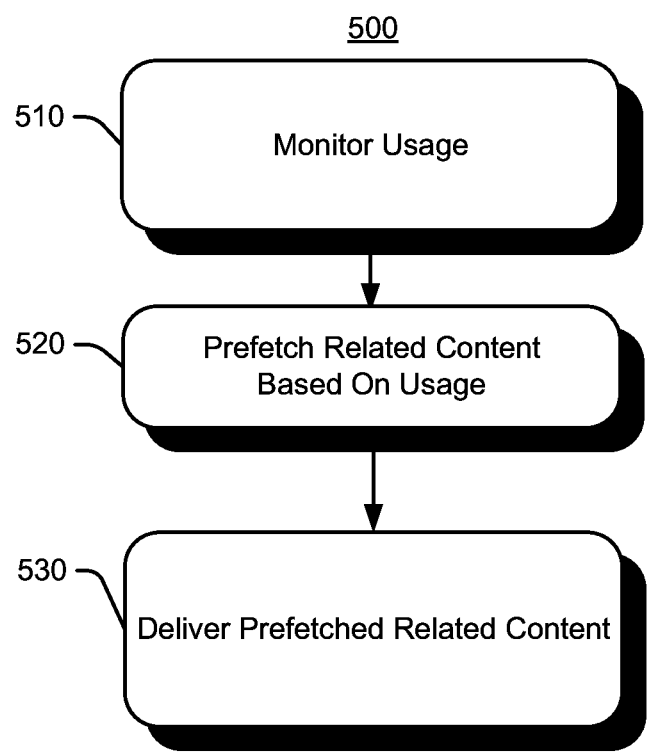
FIG. 5 is a flowchart illustrating example operations which may be implemented for accelerating delivery of remote content.

FIG. 5 is a flowchart illustrating example operations which may be implemented for accelerating delivery of remote content. Operations 500 may be embodied as logic instructions on one or more non-transient computer-readable medium. When executed on a processor, the logic instructions cause a general purpose computing device to be programmed as a special-purpose machine that implements the described operations. In an example implementation, the components and connections depicted in the figures may be used.

Operation 510 includes monitoring usage of a client for content at a remote source monitoring usage of a client for content at a remote source over time to predict client access to content. Operation 520 includes prefetching related content from the remote source based on the usage by the client. Operation 530 includes delivering the prefetched related content to the client if the client requests access to corresponding content at the remote source.

The operations shown and described herein are provided to illustrate various implementations. It is noted that the operations are not limited to the ordering shown. Still other operations may also be implemented.

For example, monitoring usage may include identifying a call function by the client. In another example, monitoring the usage may be at a parameterized data level.

Further operations may include prefetching content including subset content, and delivering at least one of the subsets to the client on demand. The subsets may represent subsets of a page. The subsets represent subsets of results.

Further operations may include prefetching adjacent content. Prefetching adjacent content may be when the client is at a predetermined position. Prefetching adjacent content may also be predictive, that is, content is retrieved proactively before the client is at a predetermined position. The adjacent content may represent adjacent pages. The adjacent content may represent adjacent results.

It is noted that in an example, the operations may be implemented at least in part using an end-user interface (e.g., web-based interface). The end-user is able to make predetermined selections, and the operations described above are implemented on a back-end device to present results to a user. The user can then make further selections. It is also noted that various of the operations described herein may be automated or partially automated.

The example embodiments shown and described are provided for purposes of illustration and are not intended to be limiting. Still other embodiments are also contemplated.

The invention claimed is:

1. A method of accelerating delivery of remote content, comprising:
    monitoring usage of a client for accessed content of a web service at a remote source over time;
    identifying related content of the web service based on
        a set of content selection functions supported by application programming interface (API) semantics of the web service and
        the usage of the client for the accessed content;
    prefetching the related content from the web service using an API of the web service;
    storing the prefetched related content in a cache; and
    delivering the prefetched related content from the cache to the client if the client requests access to corresponding content of the web service at the remote source.

2. The method of claim 1, wherein monitoring usage includes identifying an API call function by the client.

3. The method of claim 1, wherein the set of content selection functions supported by the API semantics of the web service include a panning function, and wherein the related content comprises a panned view.

4. The method of claim 1, wherein the set of content selection functions supported by the API semantics of the web service include a zooming function, and wherein the related content comprises a zoomed view.

5. The method of claim 1, wherein identifying the related content of the web service comprises identifying a plurality of content elements that are adjacent to the accessed content, wherein each of the plurality of content elements is located in a different dimensional direction from the accessed content, wherein each of the plurality of content elements is prefetched and stored in the cache.

6. The method of claim 5, wherein the plurality of content elements are adjacent to the accessed content within a coordinate space of a map.

7. The method of claim 1, wherein monitoring the usage of the client for content comprises monitoring usage of multiple clients for content of the web service at the remote source over time to predict client access to content.

8. The method of claim 1, wherein the accessed content is a page of a website, and wherein prefetching the related content comprises prefetching prior and subsequent pages of the website.

9. The method of claim 1, wherein prefetching the related content comprises predicting the client will request content at a future time and prefetching content adjacent to the future requested content.

10. The method of claim 1, wherein an amount of content prefetched may be based on a number of clients requesting content from the web service at the remote site.

11. An accelerated delivery system for remote content, comprising:
    an analyzer to:
        identify usage of a client for accessed for accessed content of a web service at a remote source over time;
        identify related content of the web service based on:
            a set of content selection functions supported by application programming interface (API) semantics of the web service, and
            the usage of the client for the accessed content;
        prefetch the related content from the web service using an API of the web service; and
    a cache to store the prefetched related content from the web service based on the identified usage, the prefetched related content available locally from the cache if requests are made to access corresponding content of the web service at the remote source.

12. The system of claim 11, wherein the analyzer monitors API call functions by the client.

13. The system of claim 11, wherein the analyzer monitors client requests for content from the web service at a parameterized data level.

14. The system of claim 11, wherein the set of content selection functions supported by the API semantics of the web service support at least one of a panning function and a zooming function, and wherein the related content comprises at least one of a panned view and a zoomed view.

15. The system of claim 11, wherein the analyzer is to identify the related content of the web service by identifying a plurality of content elements that are adjacent to the accessed content, wherein each of the plurality of content elements is located in a different dimensional direction from the accessed content, wherein each of the plurality of content elements is prefetched and stored in the cache.

16. A system for accelerating delivery of remote content to a client, the system including a non-transient computer readable medium storing program code, the program code executable to:
    identify usage by the client for accessed content of a web service at a remote source over time;
    determine related content of the web service based on application programming interface (API) semantics of the web service and the usage of the client for the accessed content;
    prefetch the related content from the web service using an API of the web service; and
    storing the prefetched related content in a cache; and
    deliver the prefetched related content from the cache to the client if the client requests access to corresponding content of the web service at the remote source,
    wherein prefetching the related content comprises prefetching the related content from the remote source based on a usage profile of the client.

17. The system of claim 16, wherein the program code is to determine the related content based on a set of content selection functions supported by the API semantics of the web service.

18. The system of claim 16, wherein the set of content selection functions supported by the API semantics include at least one of a panning function and a zooming function, and wherein the related content comprises at least one of a panned view and a zoomed view.

19. The system of claim 16, wherein the program code is to determine the related content of the web service by identifying a plurality of content elements that are adjacent to the accessed content, wherein each of the plurality of content elements is located in a different dimensional direction from the accessed content, wherein each of the plurality of content elements is prefetched and stored in the cache.

20. The system of claim 11, wherein the analyzer is to prefetch the related content from the web service based on a usage profile of the client.

* * * * *